United States Patent
Valentian

(10) Patent No.: US 6,581,882 B2
(45) Date of Patent: Jun. 24, 2003

(54) LOW-THRUST CRYOGENIC PROPULSION MODULE

(75) Inventor: Dominique Valentian, Rosny sur Seine (FR)

(73) Assignee: SNECMA Moteurs, Paris (FR)

( * ) Notice: Subject to any disclaimer, the term of this patent is extended or adjusted under 35 U.S.C. 154(b) by 0 days.

(21) Appl. No.: 10/099,636

(22) Filed: Mar. 15, 2002

(65) Prior Publication Data

US 2002/0139902 A1 Oct. 3, 2002

(30) Foreign Application Priority Data

Mar. 16, 2001 (FR) ............................................ 01 03589

(51) Int. Cl.$^7$ ............................. B64G 1/40; F02K 1/00
(52) U.S. Cl. ...................... 244/172; 244/62; 60/39.48; 60/39.76; 60/39.8
(58) Field of Search ................... 244/172, 53 R, 244/62; 60/39.48, 39.76, 39.8

(56) References Cited

U.S. PATENT DOCUMENTS

| | | | |
|---|---|---|---|
| 3,136,121 A | 6/1964 | Barger et al. ............... 60/35.6 |
| 3,597,923 A | * 8/1971 | Simon ......................... 60/260 |
| 4,385,489 A | 5/1983 | Abbott ....................... 60/39.06 |
| 4,585,191 A | * 4/1986 | Blount ........................ 244/169 |
| 4,781,018 A | * 11/1988 | Shoji ......................... 60/203.1 |
| 4,880,185 A | * 11/1989 | Apfel ......................... 244/135 B |
| 5,207,399 A | 5/1993 | Risberg et al. ............. 244/172 |
| 5,251,852 A | 10/1993 | Pulkowski et al. ...... 244/135 C |
| 5,531,067 A | * 7/1996 | Koppel ....................... 60/259 |
| 5,640,844 A | * 6/1997 | Pahl ........................... 60/259 |
| 6,516,615 B1 | * 2/2003 | Stockhausen et al. ......... 60/597 |

FOREIGN PATENT DOCUMENTS

WO    WO 87 04992 A    8/1987

* cited by examiner

Primary Examiner—J. Woodrow Eldred
(74) Attorney, Agent, or Firm—Weingarten, Schurgin, Gagnebin & Lebovici LLP

(57) ABSTRACT

The cryogenic propulsion module comprises a main cryogenic thruster (10), two attitude-controlling secondary thrusters (21, 22), tanks (31, 32, 33, 34) for feeding cryogenic propellants, a device for intermittently pressurizing the tanks (31, 32, 33, 34), and a device for initiating firing of the main cryogenic thruster (10) in intermittent manner while the tanks (31, 32, 33, 34) are intermittently pressurized. The device for intermittently pressurizing a tank (31, 32, 33, 34) comprises a heat exchange circuit associated with a heat accumulator (61, 62) and a device (71, 72) for putting a predetermined quantity of a propellant into circulation in the heat exchanger circuit. The module also comprises a device for heating the heat accumulator (61, 62) in the periods between two consecutive firings.

17 Claims, 9 Drawing Sheets

LOW-THRUST CRYOGENIC PROPULSION MODULE

FIELD OF THE INVENTION

The present invention relates to a low-thrust cryogenic propulsion module applicable to a conventional launcher or to a recoverable launcher.

The invention relates more particularly to a low-thrust cryogenic propulsion module for transferring the orbit of a satellite, the propulsion module being suitable for being integrated in the satellite or for constituting a separate propulsion stage.

PRIOR ART

A major preoccupation in the field of launching satellites lies in improving the mass injected into geostationary orbit for given launcher mass.

The most conventional method consists in injecting a satellite into a geostationary transfer orbit (GTO) and then in transferring the satellite into geostationary orbit using a two-liquid apogee engine, the two-liquid propulsion module being integrated in the satellite.

Proposals have also been made to transfer a satellite from a low orbit into a geostationary orbit by means of a solar thermal stage using liquid hydrogen.

Such a method is described, for example, in the article by J. A. Bonometti and C. W. Hawk entitled "Solar thermal rocket research apparatus and proposed testing" (University of Alabama, 1994).

That method is also mentioned in the article by J. M. Shoji published in Progress in Astronautics and Aeronautics, AIAA, Vol. 87, (pp. 30 to 47), and entitled "Potential of advanced solar thermal propulsion. Orbit raising and maneuvering propulsion: research status and needs".

In that known method, which is shown in FIG. 2, light from the sun is concentrated by a parabolic mirror 5 onto a solar furnace 6 in which hydrogen is heated to a temperature of about 2000 K. The hydrogen is then expanded in a nozzle of a thruster 8 to deliver a high ejection speed (7500 meters per second (m/s) to 8000 m/s), giving a specific impulse of about 750 seconds (s) to 800 s. FIG. 2 is a diagram showing such an arrangement with a satellite 2 connected firstly to a launcher via an interface 1 and secondly to a hydrogen tank 3 via a truss 4. Reference 7 represents diagrammatically a device for acquiring liquid hydrogen in order to feed the solar furnace 6 and the thruster 8.

Such a device, which has never been used in practice, ought theoretically to make it possible to increase the mass that it injected into geostationary orbit. Nevertheless, that configuration presents various drawbacks.

In particular, in order to reach a temperature of 2000 K, it is necessary to use a solar flux concentration factor of 5000 to 8000, which requires a mirror of very good quality, which is very difficult to obtain when subject to constraints limiting on-board mass. In addition, pointing towards the sun must be very accurate, of the order of ±5 minutes of arc about two axes, which gives rise to problems in attitude control.

The size of the liquid hydrogen tank 3 also constitutes a difficulty. For example, in order to obtain total delivered impulse of 30 meganewton-seconds (MN.s), it is necessary to use a tank containing 4000 kilograms (kg) of liquid hydrogen which thus presents a volume of 60 cubic meters ($m^3$) (which, for example, implies a diameter of 4.2 m and a height of 5 m).

Developments in orbit transfer systems based on a solar thermal stage are in serious difficulty due to those drawbacks.

In another technique for increasing the mass placed in geostationary orbit, use is made of a launcher top stage of the cryogenic type that makes it possible to use tanks of relatively small volume that are easier to integrate in the launcher. Thus, to obtain a total impulse of 30 MN.s, a liquid hydrogen and liquid oxygen cryogenic stage requires a propellant mass of 6600 kg, but the total volume of the tanks is only 22 $m^3$.

Cryogenic stages currently in use nevertheless require turbopumps to be used, and that increases their cost.

Certain authors have proposed making cryogenic stages that are fed by means of pressure, without using turbopumps, but those concepts have not given rise to concrete implementations. In practice, the hydrogen must always be at a higher pressure than the oxygen in order to perform regenerative cooling of the combustion chamber. It follows that the mass of helium required for pressurization purposes becomes prohibitive.

OBJECT AND BRIEF SUMMARY OF THE INVENTION

The invention seeks to remedy the above-mentioned drawbacks and in particular to enable the orbit of a satellite to be transferred using a device that is simpler, lighter, and more compact than prior art devices while avoiding the use of turbopumps and making it possible to use both thrusters and propellant tanks of reasonable size reducing the bulk of the propulsion stage in question required for transferring the orbit of the satellite.

These objects are achieved by a low-thrust cryogenic propulsion module presenting thrust lying in the range 100 N to 1000 N, the module being characterized in that it comprises at least one main cryogenic thruster whose combustion pressure lies in the range 2 bars to 10 bars, at least two attitude-controlling secondary thrusters, at least first and second feed tanks for feeding cryogenic propellants, means for intermittently pressurizing said feed tanks, and means for triggering intermittent firing of the main cryogenic thruster during intermittent pressurization of said feed tanks, the duration between two successive firings lying in the range about 1 hour (h) 30 minutes (min) to 12 h, in that the means for intermittently pressurizing a feed tank comprises at least one heat exchange circuit associated with a heat accumulator and with means for circulating a predetermined quantity of a propellant through said heat exchanger, and in that it further comprises means for heating the heat accumulator in the periods that lie between two consecutive firings.

The heat accumulator associated with the propellant tank can be heated, at least in part, by means of a solar collector, e.g. using a plane solar collector having an absorptance/emissivity ratio ($\alpha/\epsilon$) greater than one, and which is provided with superinsulation on its rear face.

Nevertheless, the heat accumulator can also be heated at least in part by recovering heat losses from a fuel cell operating by means of evaporated propellants.

The fuel cell can be fed with cold propellant vapor coming from a heat exchanger for keeping the temperature at which propellant is taken from a propellant tank constant.

The heat accumulator can also be heated, at least in part, by electrical heating.

Heat accumulation within the heat accumulator is advantageously performed by a material that changes phase, such as an alkali metal or a hydrocarbon.

In a particular embodiment, the cryogenic propulsion module comprises first and second propellant tanks for feeding the main thruster and the propellants are fully vaporized in the heat accumulators associated with the tanks so as to guarantee a constant mixture ratio.

In an advantageous embodiment, the cryogenic propulsion module has at least first and second main propellant tanks and at least first and second secondary propellant tanks constituting buffer tanks, which secondary tanks can be pressurized by said pressurizing means and are dimensioned in such a manner as to enable orbital maneuvering to be performed while feeding the main thruster intermittently and so as to be completely emptied at the end of firing, means being provided for re-feeding said secondary tanks from the corresponding main tanks between two successive firings, with the pressure of the main tanks being kept below the pressure at which the main thruster is fed.

Under such circumstances, in a particular embodiment, a secondary tank is covered in thermal insulation and is mounted inside a main tank.

BRIEF DESCRIPTION OF THE DRAWINGS

Other characteristics and advantages of the invention will appear from the following description of particular embodiments of the invention given as examples with reference to the accompanying drawings, in which.

DETAILED DESCRIPTION OF PARTICULAR EMBODIMENTS OF THE INVENTION

Figure 1:
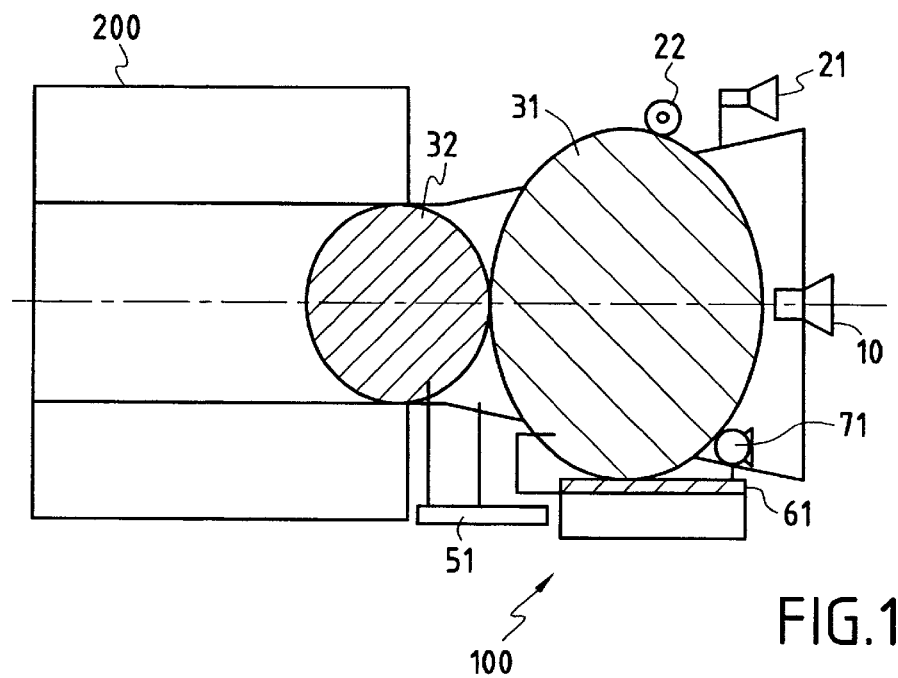
FIG. 1 is a diagrammatic overall view of an embodiment of a cryogenic propulsion module of the invention and a satellite with which the module is associated.
Figure 2:
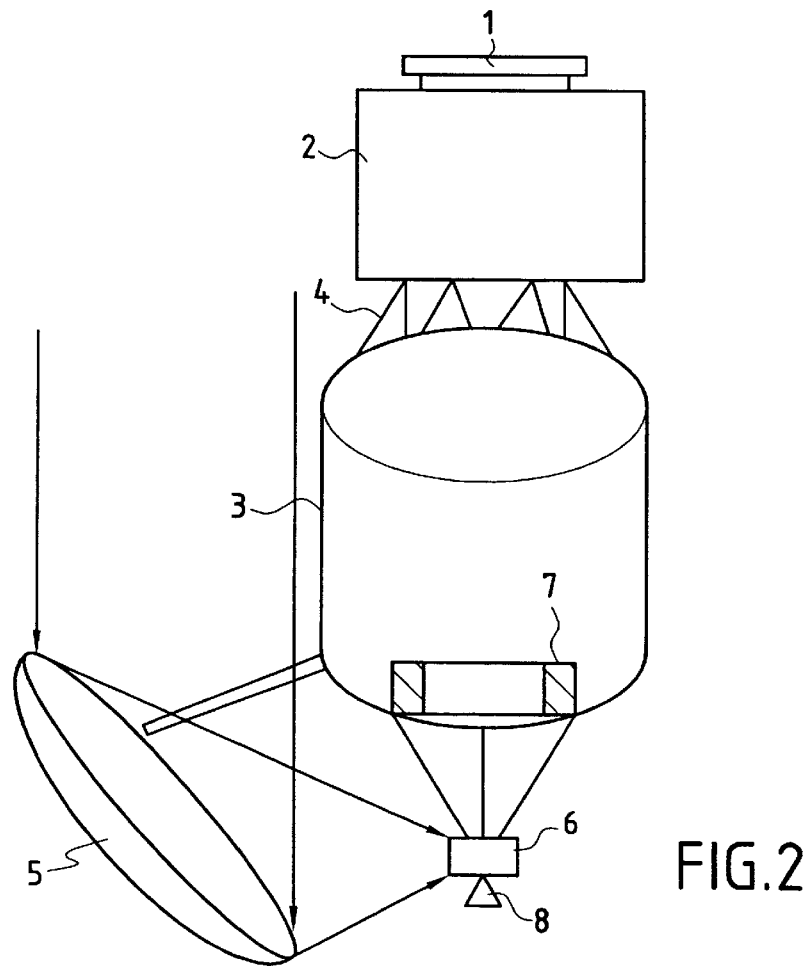
FIG. 2 is a diagram of a solar thermal stage of the prior art and the satellite with which said solar thermal stage is associated.

FIG. 1 is an overall diagram showing an example of a cryogenic propulsion module 100 of the invention that comprises a main thruster 10 of the oxygen-hydrogen type whose combustion pressure of about 2 bars to 10 bars is low enough to produce heat flux through the wall that is five to ten times smaller than when using a conventional cryogenic thruster, thus making it possible for this main thruster 10 to make do with simplified regenerative cooling or even with cooling by radiation and by film.

The main thruster 10 can be a single thruster and mounted on a gimbal mount, or it can comprise a set of at least three main cryogenic thrusters having individual thrust that can be controlled by varying head losses in the propellant feed circuits.

The main thruster 10 or the set of main thrusters, provide low thrust, of the order of 100 newtons (N) to 1000 N, thus making it possible for them to be compact and thus to reduce the overall bulk of the thrust stage. By way of example, using a plurality of low-thrust main thrusters it is possible to reduce the length of the stage by more than 3 m compared with a conventional configuration.

The thrust module 100 can have between two and six attitude control thrusters, such as a yaw control thruster 21 and a roll control thruster 22, for example.

The propulsion module 100 can be powered electrically by means of a photovoltaic solar panel 51 attached to the module, or else by means of an umbilical cord connected to the satellite 200 which is to be put into orbit together with the propulsion module 100. Electrical power can also be generated by a fuel cell, such as the fuel cell 270 shown in FIG. 11, which can be fed by evaporating the cryogenic propellants.

The main thruster 10 is fed with propellant intermittently by pressurizing the main tanks 31 and 32 that store liquid hydrogen and liquid oxygen, respectively. Since operating pressure is low, the structure indices of the tanks 31 and 32 remain reasonable.

Figure 4:
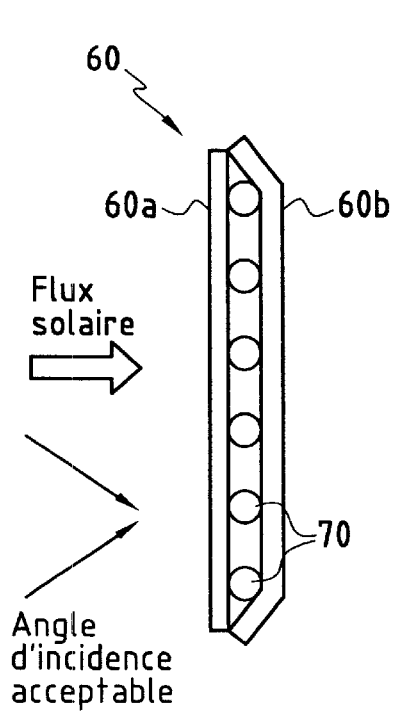
FIGS. 4 and 5 are respectively a section view and a face view of a plane solar collector with an integrated heat accumulator and heat exchanger, suitable for use in the context of the present invention.
Figure 5:
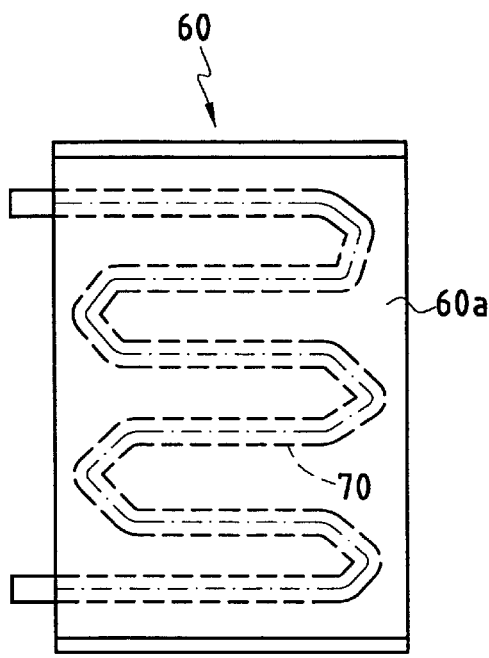
Figure 6:
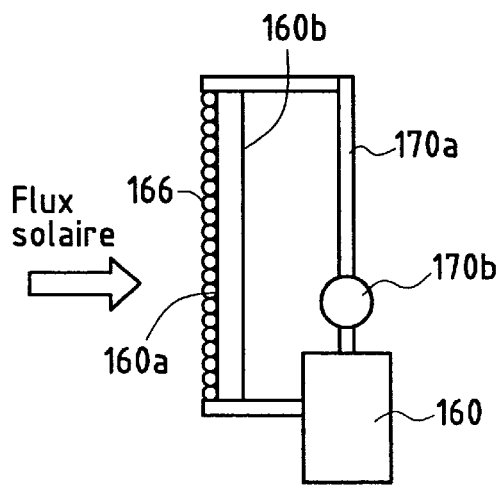
FIG. 6 is a diagrammatic section view showing a plane solar collector associated with a separate heat accumulator.

The tanks 31 and 32 feeding cryogenic propellants such as $H_2$ and $O_2$ are pressurized without using turbopumps, merely by evaporating a predetermined quantity of each propellant in a heat accumulator such as the accumulator 60 shown in FIGS. 4 and 5 or the accumulator 160 in FIG. 6, for example. The heat accumulator 60 is associated with a heat exchanger 70 and with an electrical micropump for circulating a determined quantity of propellants in the heat exchanger circuit 70.

By way of example, FIG. 1 shows a first micropump 71 associated with the first tank 31 and with a heat accumulator 61.

The heat accumulator 60, 160 is heated during the periods that lie between two successive firings of the main thruster 10.

The heat accumulator can be heated either by solar heating, or by electric heating, or by recovering heat lost from a fuel cell operating on evaporated propellants, or by a combination of the three methods.

The heat accumulator is heated between two consecutive firings of the thruster(s) 10, with this waiting time between two firings lying in the range 1 h 30 min and 12 h, depending on the eccentricity of the orbit. By way of example, there can be ten to 30 successive firings of the main thruster 10, with these firings taking place at the perigee or at the apogee of the orbit, so that orbital maneuvering is thus implemented incrementally, given that the cryogenic thrust module 100 is deliberately of low thrust. The time intervals between two successive firings are nevertheless not wasted and they are used for heating the heat accumulator.

FIGS. 4 and 5 show an example of a heat accumulator 60 comprising a plane solar collector 60a that directly heats the heat accumulator 60 which is in contact with tubes for circulating hydrogen in a heat exchanger circuit 70. A layer of superinsulation 60b is placed on the rear of the heat accumulator 60 and of the heat exchanger 70.

The heat accumulator 60 proper is advantageously constituted by a material that changes phase, such as an alkali metal or a hydrocarbon, thus making it possible to reduce mass.

The plane solar sensor 60a can be provided with a coating to provide controlled emissivity (absorptance/emissivity ratio $\alpha/\epsilon \gg 1$) so that this collector can reach a balanced temperature higher than 100° C. when in the sunlight. The collector of FIGS. 4 and 5 can accept solar flux angles of incidence lying over a range of several degrees.

As a variant, FIG. 6 shows an example of a plane solar collector 160a associated with a layer of superinsulation 160b situated on its rear face and serving to heat a separate heat accumulator 160 via an array of tubes 160 placed on the front face of the collector 160a and a network 170a for circulating fluid in association with a microfan 170b.

Unlike solar thermal propulsion, the use of plane solar collectors 60a makes it possible to eliminate requirements for accurate pointing, with an error of about ±20° about two axes being quite acceptable.

Figure 7:
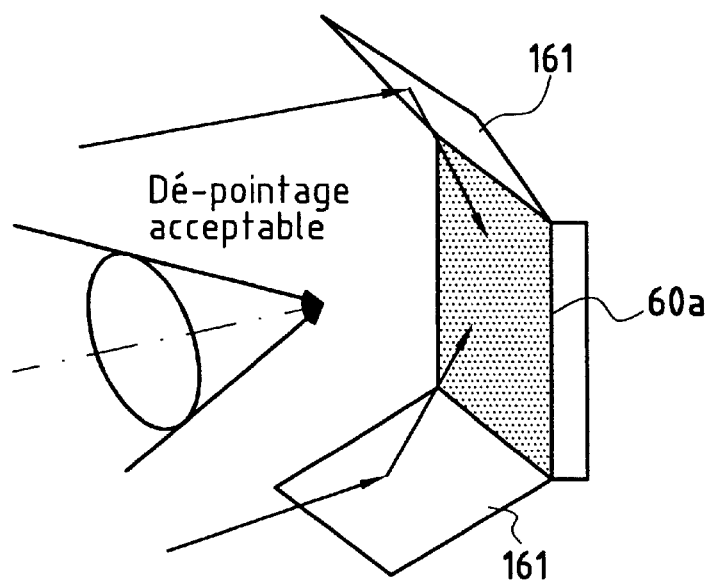
FIG. 7 is a perspective view showing an example of a passage solar collector associated with plane mirrors suitable for use in the context of the present invention.
Figure 8:
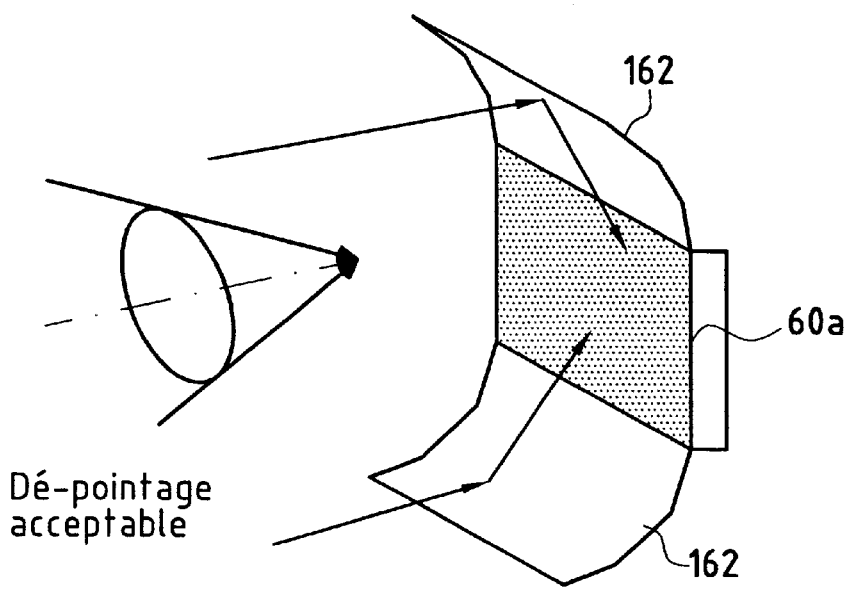
FIG. 8 is a perspective view showing an example of a passage solar sensor associated with parabolic mirrors.

The area and thus the mass of the solar collector 60a can be diminished by using concentrator mirrors that are plane 161 (FIG. 7) or that are parabolic-cylindrical 162 (FIG. 8), without such mirrors increasing requirements in terms of pointing to the sun.

Figure 3:
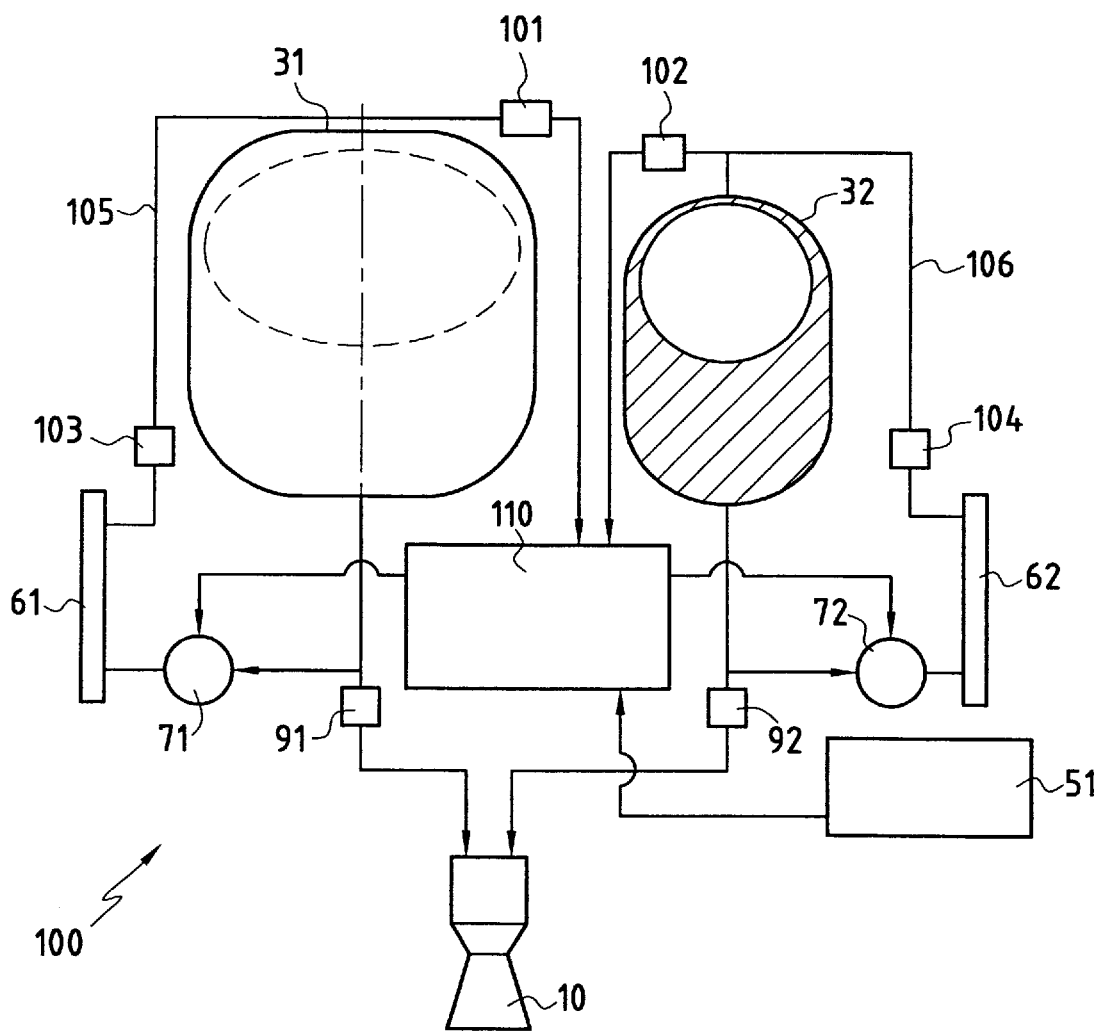
FIG. 3 is an overall diagram of the main functional members of an example of a solar-heated cryogenic propulsion module constituting an embodiment of the invention.

FIG. 3 shows the theoretical circuit for pressurizing the tanks 31 and 32 by accumulating heat using heat accumulators 61, 62 fitted with solar collectors and associated with respective ones of the main tanks 31 and 32 for liquid hydrogen and liquid oxygen.

In the example of FIG. 3, an electronic control circuit 110 powered by a solar panel 51 powers electrical micropumps 71, 72 associated with the tanks 31, 32. The solar panel 51 can be mounted on the propulsion module or on the satellite that is to be put into orbit, with electrical connection between the solar panel 51 and the electrical control circuit optionally taking place via a jettisonable connector. Nevertheless, the propulsion module 100 can itself be integrated in the satellite 200.

The electrical micropumps 71, 72 inject the liquid propellants, on demand, into the heat accumulators 61, 62, thereby raising their temperatures to the vicinity of ambient and thus enabling the corresponding tanks 31, 32 to be pressurized via lines 105, 106.

Once the reference pressures have been reached, the micropumps 71, 72 are stopped. The micropumps 71, 72 are controlled by electronic control circuits 110 connected to pressure sensors 101, 102 measuring pressure in the tanks 31, 32.

Once the tanks 31, 32 have been pressurized, it suffices to open the solenoid valves 91 and 92 to feed the main engine 10 with propellants, and then to light the engine 10 by means of an electrical discharge so as to perform the orbital maneuvering.

Figure 9:
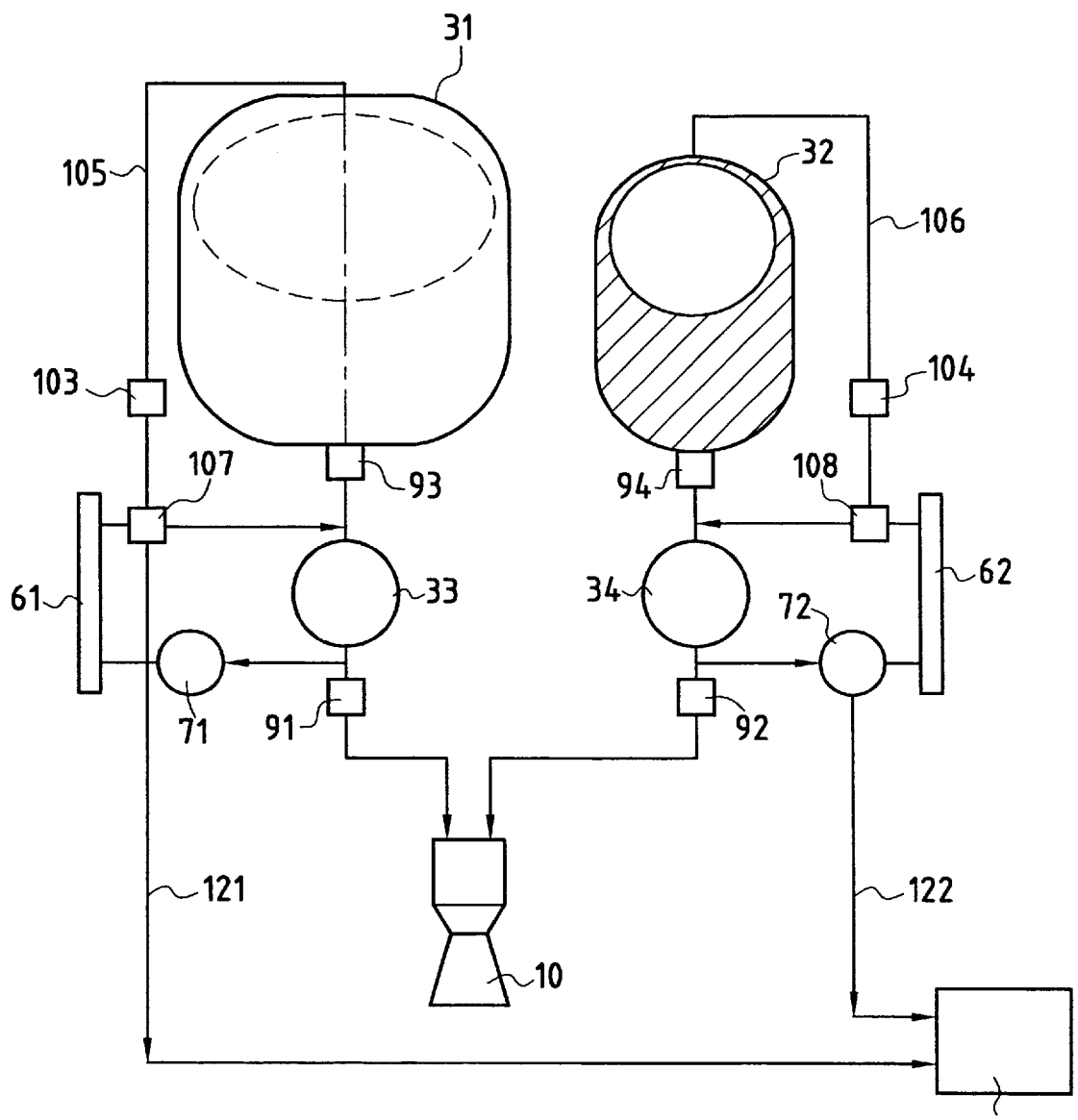
FIG. 9 is an overall diagram of the main functional members of an example of a cryogenic propulsion module of the invention implementing auxiliary buffer tanks.
Figure 10:
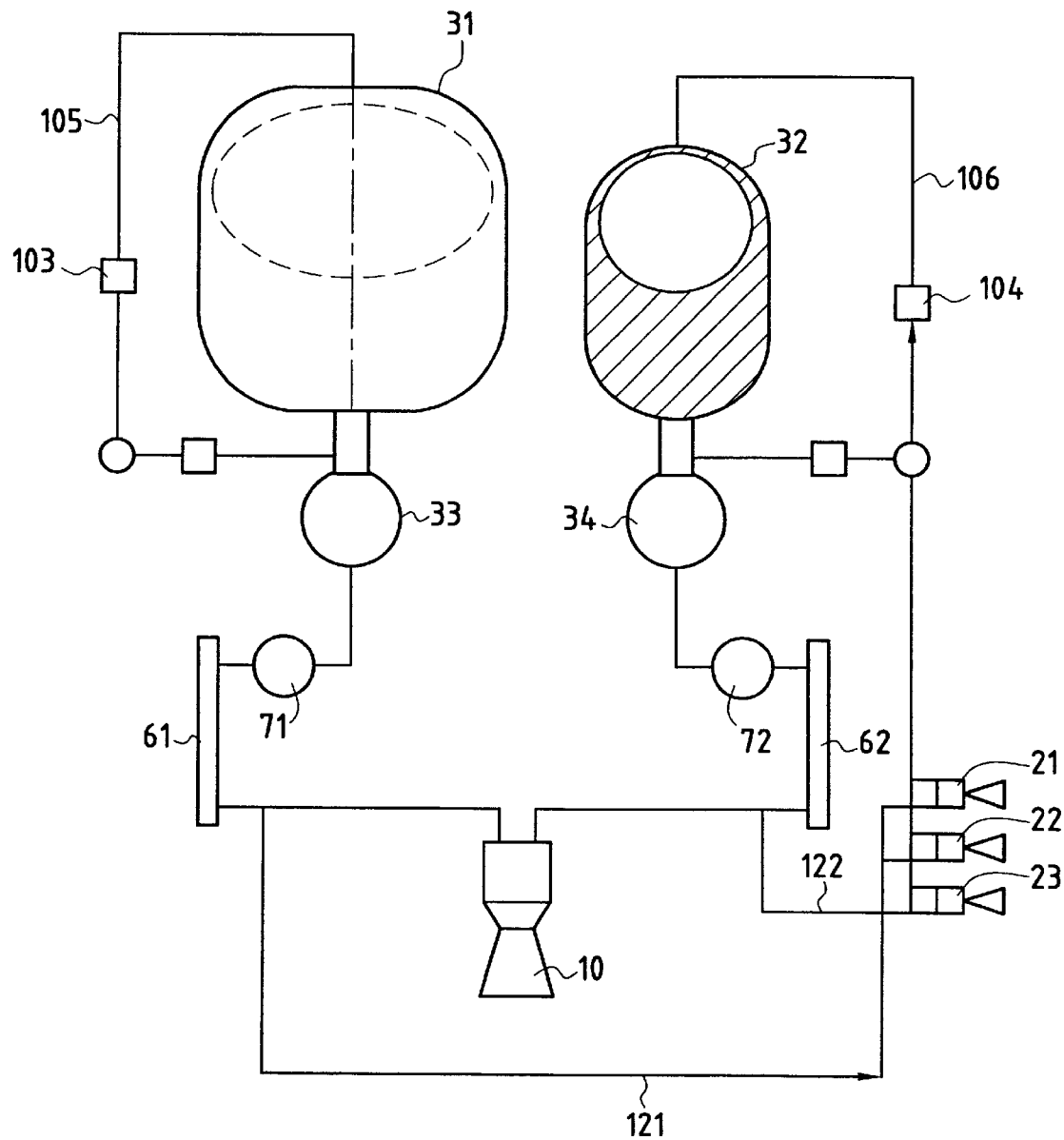
FIG. 10 is an overall diagram of the main functional members of another example of a propulsion module of the invention having auxiliary buffer tanks and implementing preliminary vaporization of the propellants.
Figure 11:
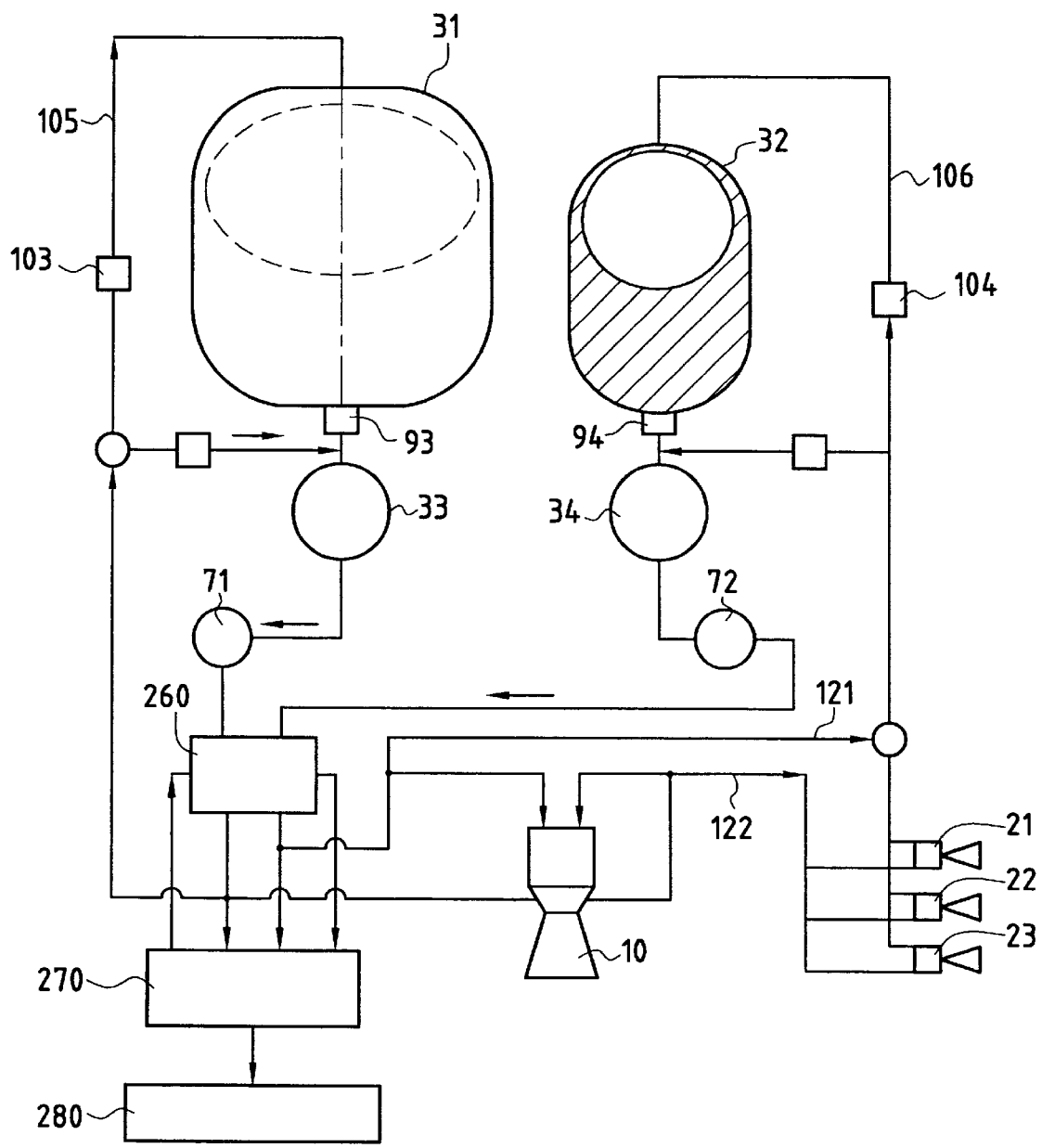
FIG. 11 is an overall diagram of the main functional members of another example of a propulsion module of the invention using a fuel cell.

The configuration shown in FIG. 3 can be improved by using auxiliary buffer tanks 33, 34 in association with the main propellant tanks 31, 32, as shown in FIGS. 9 to 11, which figures nevertheless do not reproduce the electronic control circuit 110, the pressure sensors 101, 102, and the electrical power supply 51 in order to clarify the drawings, even though these elements also form parts of the embodiments shown in FIGS. 9 to 11.

Insofar as the mass of propellants used during a maneuver is of the order of 100 kg, it is possible during maneuvering to make use of buffer tanks 33, 34 that are of small size and that are easier to pressurize than the main tanks 31, 32. This also makes it possible to reduce the structure indices of the main tanks 31, 32 since they are subject only to moderate pressure, of the order of 1 bar absolute.

With reference to FIG. 9, it can be seen that the auxiliary tanks 33 and 34 which are initially at low pressure after firing can be filled with respective propellants from the main tanks 31 and 32 by opening valves 93 and 94 for putting the main tanks 31 and 32 into communication with the corresponding auxiliary tanks 33 and 34.

Thereafter, the auxiliary tanks 33 and 34 are pressurized by activating the micropumps 71, 72 to inject the liquid propellants into the heat accumulators 61, 62, while the valves 103, 104 situated on the pipes 105, 106 for pressurizing the main tanks 31, 32 remain closed.

The pressure in the auxiliary tanks 33, 34 can thus be raised from 1 bar to 5 bars, for example. Once the reference pressure has been reached, the valves 91, 92 feeding the main thruster 10 are opened and the maneuver can take place.

While the thruster 10 is firing, the pressure in the buffer tanks 33, 34 is maintained more or less constant by activating the micropumps on demand.

The gas flows circulating through the heat accumulators 61, 62 also make it possible to operate the attitude control thrusters 21, 22 via lines 121, 122 which are fed with propellants in gaseous form via valves 107, 108 interposed between the heat accumulators 61, 62 and the buffer tanks 33, 34.

It should be observed that in the embodiments of FIGS. 1 and 9, the main thruster 10 is fed with liquid propellants.

It might be desirable to feed the thruster 10 with propellants that have vaporized so as to avoid difficulties associated with cooling or with large variations in the mixture ratio which might arise given the small size of the main thruster 10.

FIG. 10 shows an embodiment of the invention in which not only are the auxiliary thrusters 21, 22, 23 fed with gas, but the main thruster 10 is itself also fed with gaseous propellants that have been vaporized in the heat accumulators 61, 62.

In FIG. 10, where elements similar to those of FIG. 9 are given the same reference numerals, all of the liquid delivered by the micropumps 71, 72 into the heat accumulators 61, 62 is vaporized. The thermal capacity of the heat accumulators needs to be adapted accordingly. The vaporized propellants are not delivered to the buffer tanks 33, 34 after passing through the heat accumulators 61, 62, but on the contrary they are injected directly into the main thruster 10 and into the secondary thrusters 21 to 23.

By way of example, in order to vaporize and then heat 20 kg of liquid hydrogen, 37 megajoules (MJ) of energy are required which is equivalent to a mean power of 2500 watts (W) over a period of 3 h. A solar collector having an area of 2.2 m$^2$ is quite large enough to deliver such power.

In order to enable the buffer tanks to be filled under microgravity, it should be observed that it is necessary to be certain that the liquid propellant is always present at the drawing-off end of each main tank.

To solve this problem, the liquid propellants are caused to circulate slowly over the tank walls and the drawing-off point is cooled locally by means of a heat exchanger.

One example of such a device is known as an active thermodynamic vent system (ATVS) and is described in the publication by E. C. Cady and A. D. Olsen entitled "Thermal upper stage technology demonstration program", AIAA 96, 3011, 32nd AIAA Joint Propulsion Conference, Lake Buena Vista, July 1996.

Figure 12:
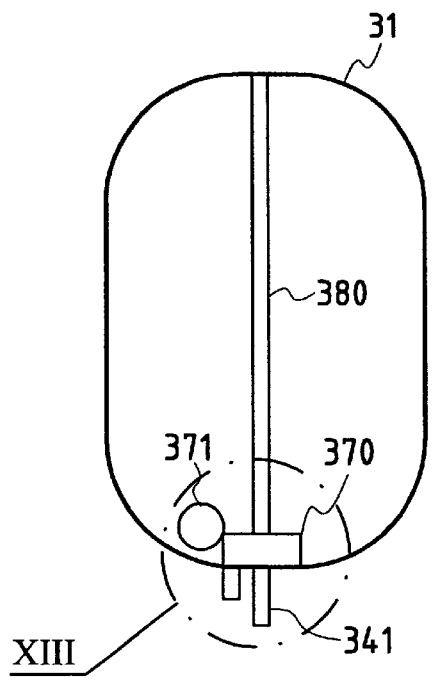
FIG. 12 shows how a heat exchanger is installed in the bottom of a main propellant tank usable in the cryogenic propulsion module of the invention.
Figure 13:
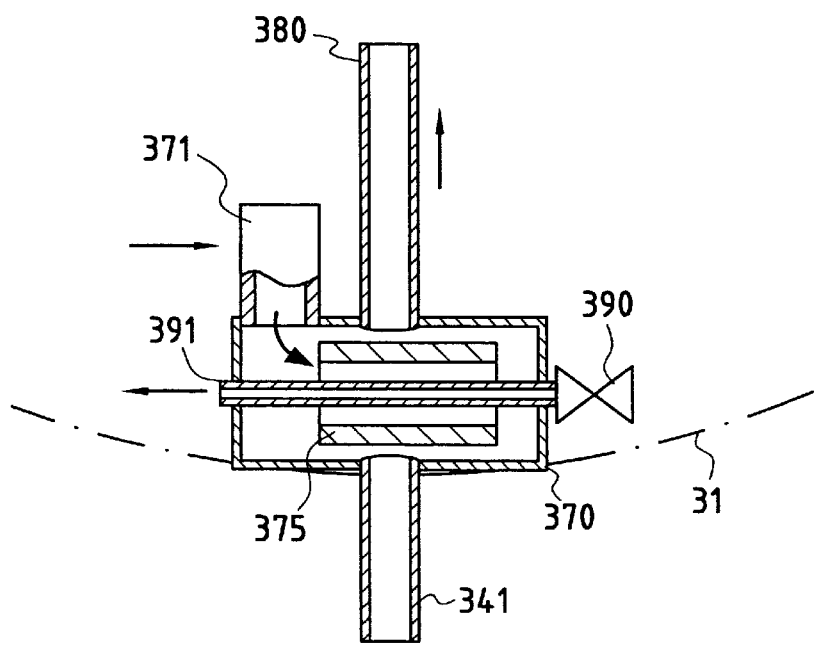
FIG. 13 shows a detail of an embodiment of the heat exchanger shown in FIG. 12.

FIGS. 12 and 13 show an embodiment of such a device in a main tank 31 of a propulsion module of the invention.

The end wall of the tank 31 is occupied by a drawing-off volume which is cooled by a heat exchanger 370 that can comprise a finned heat exchanger tube 375. A small electric pump 371 serves to circulate the cooled fluid inside the tank by means of a central tube 380. An expansion valve 390 allows the fluid to vaporize and the cold vapor is then extracted from the tank by a tube 391. Cold vapor can be drawn off only while the main thruster is firing, itself being fed via the bottom pipe 341.

FIG. 11 shows an embodiment that uses a fuel cell 270 that can be fed continuously with propellants from the main and auxiliary tanks 31, 32 and 33, 34. In particular, the fuel cell 270 can be fed with cold vapor from the heat exchanger that is intended for maintaining the drawing-off temperature constant in each main tank.

The fuel cell 270 serves, via a power bus bar 280, to feed the power required by various services (pumps, valves, electric heaters) and also by the equipment bay of the propulsion module (inertial navigation unit, on-board computer, radio links).

Since the efficiency of the cell 270 is about 50%, its losses are used for heating all or part of the propellants fed to the main thruster 10 by means of a module 260 that constitutes a heat exchanger and heat accumulator. The power dissipated by the cell 270 is thus stored in the accumulator 260 for the purpose of heating the liquid propellants, thus enabling the auxiliary tanks 33, 34 to be pressurized and feeding both the main thruster 10 and the attitude control thrusters 21 to 23.

If the cell develops mean power of 1 kW, the energy that can be accumulated over 3 h amounts to substantially 11 MJ.

In an embodiment of the kind shown in FIG. 11 but using a fuel cell 270 instead of a solar collector 60a as its source of heat, attitude control by the secondary thrusters 21 to 23 can be decoupled from pointing towards the sun, which provides additional freedom in positioning.

Figure 14:
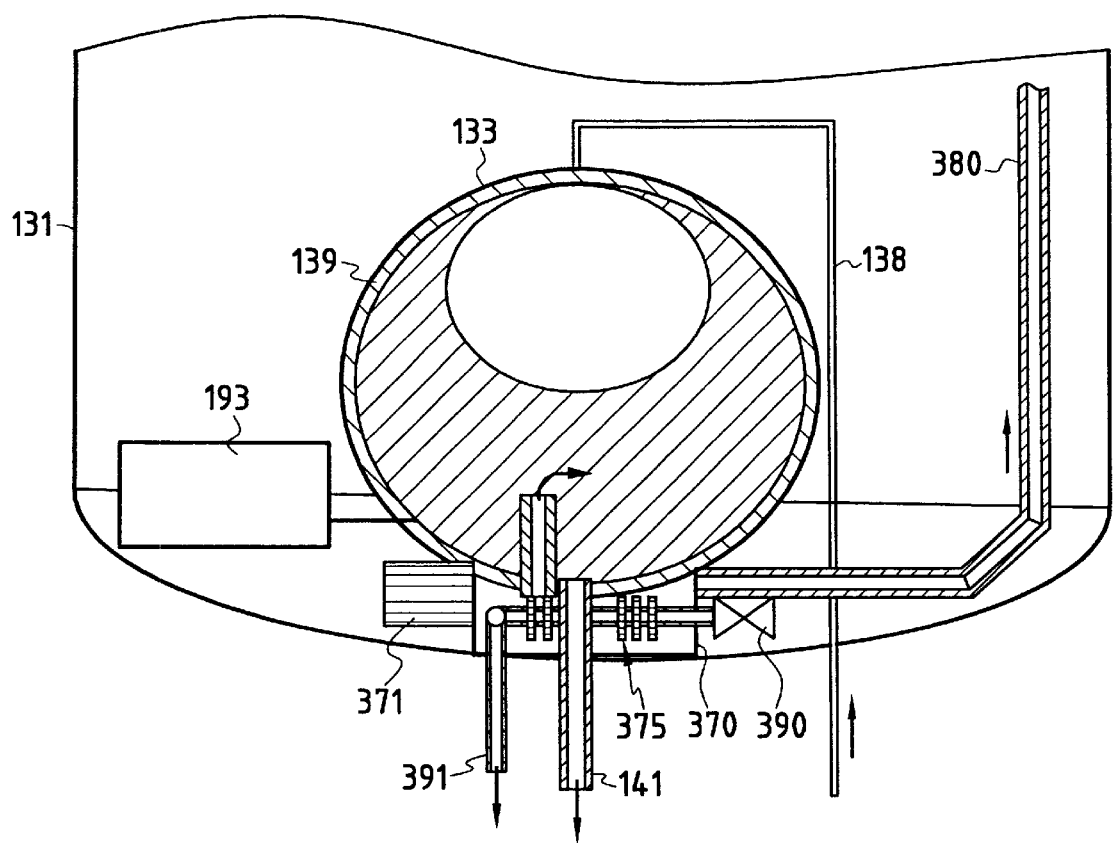
FIG. 14 is a fragmentary view of a main propellant tank usable in the cryogenic propulsion module of the invention and incorporating a buffer tank inside the main tank.

FIG. 14 shows a variant embodiment in which a buffer tank 133 is located inside a main tank 131. This makes it possible to provide an assembly which is more compact and to reduce heat losses.

The buffer tank 133 is provided with an outer layer 139 of thermal insulation and it is associated with a filler valve 193 and with a line 138 for pressurizing the tank.

The buffer tank 133 is mounted over a heat exchanger 370 which can be similar to the heat exchanger in FIG. 13. The presence of a buffer tank 133 incorporated inside a main tank 131 encourages liquid to be retained close to the heat exchanger 370, in particular towards the end of operation. The circulation tube 380 is offset to one side of the main tank 131.

In a propulsion module of the invention, the thrust vector can be controlled in three different ways, with the anti-roll function itself being provided by at least two auxiliary thrusters 21, 22.

Firstly, the main thruster 10 is associated with two pairs of auxiliary thrusters for controlling pitching and yaw, having axes parallel to the main thruster 10 which is fixed.

Secondly, the main thruster 10 can be mounted on a gimbal mount. Two electromechanical actuators serve to steer it relative to the propulsion module.

Thirdly, the main thruster function can be provided by three or four thrusters each delivering thrust that can be adjusted by means of a proportional valve throttling the propellant flow rate to a greater or lesser extent, thereby enabling the position of the thrust vector to be controlled relative to the center of gravity.

When the cryogenic propulsion module 100 of the invention makes use of solar collectors, it should be observed that the pointing requirements are very easy to satisfy (tolerance of about 20° about two axes) whereas when implementing solutions of the solar thermal type pointing needs to be accurate to within 5 minutes of arc about two axes.

Furthermore, the low-thrust cryogenic thruster is of reduced volume because the mean specific gravity of its propellants is 0.3 instead of being 0.07 as it is in solar thermal configurations, thereby making it easier to integrate under a nose cone. In addition, the dry mass of the module of the invention is reduced since less heat is stored, and the mass percentage of the tanks is less than 10% (compared with about twice that in a solar thermal solution) and a primary solar energy concentrator is no longer required as it is with a solar thermal solution. Finally, the total duration of a mission is also shortened when using a propulsion module of the invention.

In comparison with a conventional cryogenic top stage, a propulsion module of the invention using the same technology presents lower dry mass because no use is made of helium spheres or of gas expansion plates, and because the main thruster is itself lighter in weight and carries much less clutter. In addition, the main thruster is cheaper and most of the other components, being small in size, are likewise of reduced cost.

For a cryogenic top stage fed by the pressure of a tank in conventional manner, it should be observed that the low pressure of the combustion combined with high thrust leads to a thruster that is very bulky, while nevertheless presenting a section ratio that is smaller than that of an engine using turbopumps, i.e. lower specific impulse.

In contrast, the solution proposed in the context of the present invention makes it possible to reconcile low pressure at combustion with small bulk by using multiple firings at the apsides.

The low pressure of combustion reduces the heat flux which is about eight times lower than with a turbopump engine, thus making it possible to use simplified regenerative cooling, or indeed cooling by radiation.

Furthermore, the use of solar heating, at least for pressurizing the tanks, makes it possible to eliminate the mass and equipment associated with pressurization using helium.

Finally, the invention makes it easy to coordinate intermittent firing sequences with stages during which the heat accumulators are re-heated.

What is claimed is:

1. A low-thrust cryogenic propulsion module presenting thrust lying in the range 100 N to 1000 N, the module being characterized in that it comprises at least one main cryogenic thruster whose combustion pressure lies in the range 2 bars to 10 bars, at least two attitude-controlling secondary thrusters, at least first and second feed tanks for feeding cryogenic propellants, means for intermittently pressurizing said feed tanks, and means for triggering intermittent firing of the main cryogenic thruster during intermittent pressurization of said feed tanks, the duration between two successive firings lying in the range about 1 h 30 mm to 12 h, in that the means for intermittently pressurizing a feed tank comprises at least one heat exchange circuit associated with a heat accumulator and with means for circulating a predetermined quantity of a propellant through said heat exchange circuit, and in that it further comprises means for heating the heat accumulator in the periods that lie between two consecutive firings.

2. A propulsion module according to claim 1, characterized in that the heat accumulator is heated at least in part by means of a solar collector.

3. A propulsion module according to claim 2, characterized in that the heat accumulator is heated by a plane solar collector having an absorptance/emissivity ratio ($\alpha/\epsilon$) greater than 1 and provided with superinsulation on its rear face.

4. A propulsion module according to claim 2, characterized in that the solar collector is associated with a system of plane or parabolic-cylindrical concentration mirrors.

5. A propulsion module according to claim 1, characterized in that the heat accumulator is heated at least in part by recovering heat losses from a fuel cell operating on evaporated propellants.

6. A propulsion module according to claim 1, characterized in that heat is accumulated within the heat accumulator by means of a material that changes phase, such as an alkali metal or a hydrocarbon.

7. A propulsion module according to claim 5, characterized in that the fuel cell is fed with cold vapor from a heat exchanger for keeping the drawing-off temperature in a propellant tank constant.

8. A propulsion module according to claim 1, characterized in that the heat accumulator is heated at least in part by electrical heating.

9. A propulsion module according to claim 1, characterized in that it has a single main cryogenic thruster mounted on a gimbal mount.

10. A propulsion module according to claim 1, characterized in that it has at least three main cryogenic thrusters each delivering individual thrust that can be controlled by varying head losses in the propellant feed circuits.

11. A propulsion module according to claim 1, characterized in that it has first and second propellant tanks for feeding the main thruster, and in that the propellants are fully vaporized in the heat accumulators associated with the first and second propellant tanks so as to guarantee a constant mixture ratio.

12. A propulsion module according to claim 1, characterized in that a feed tank is provided with a circulation pump mounted on the body of an associated heat exchanger situated at the drawing-off end.

13. A propulsion module according to claim 1, characterized in that it has at least first and second main propellant tanks and at least first and second secondary propellant tanks constituting buffer tanks, which secondary tanks can be pressurized by said pressurizing means and are dimensioned in such a manner as to enable an orbital maneuver to be performed when they feed the main thruster intermittently and so as to be completely emptied at the end of firing, means being provided for refilling said secondary tanks from the corresponding main tanks between two successive firings, and the pressure in the main tanks being maintained below the feed pressure for the main thruster.

14. A propulsion module according to claim 1, characterized in that at least one secondary tank is covered in thermal insulation and is mounted inside a main tank.

15. A propulsion module according to claim 1, characterized in that it has an electrical power supply constituted by a fuel cell fed by evaporation of cryogenic propellants.

16. A propulsion module according to claim 1, characterized in that it has an electrical power supply constituted by at least one solar panel attached to the module.

17. A propulsion module according to claim 1, characterized in that it has an electrical power supply constituted by an umbilical connection connected to the satellite that is put into orbit using the module.

* * * * *

UNITED STATES PATENT AND TRADEMARK OFFICE
CERTIFICATE OF CORRECTION

PATENT NO. : 6,581,882 B2 Page 1 of 1
APPLICATION NO. : 10/099636
DATED : June 24, 2003
INVENTOR(S) : Dominique Valentian It is certified that error appears in the above-identified patent and that said Letters Patent is hereby corrected as shown below:

Column 9, claim 1, line 7, "mm" should read --min--.

Signed and Sealed this

Fifth Day of June, 2007

JON W. DUDAS
*Director of the United States Patent and Trademark Office*